United States Patent Office 3,447,888
Patented June 3, 1969

3,447,888
COLORED FABRIC AND METHOD
OF COLORING SAME
Herman S. Weisz and Parker W. Downing, Rock Hill, S.C., assignors to M. Lowenstein & Sons, Inc., New York, N.Y., a corporation of New York
No Drawing. Filed Apr. 19, 1966, Ser. No. 543,521
Int. Cl. D06p 5/00, 1/00
U.S. Cl. 8—69    5 Claims

ABSTRACT OF THE DISCLOSURE

A colored fabric is provided by application of a composite shade resulting from the additive effect of a first color component from a resin bonded pigment system containing pigment fast to chlorine bleaching, and a second color component from an acid fixed fiber reactive dye that may be discharged upon treatment of the fabric with a chlorine bleaching agent.

---

This invention relates to colored fabrics prepared by dyeing or printing and, in particular, to dyed or printed cellulosic fiber fabrics having a composite shade obtained under acid conditions as the additive effect of a first color component derived from a resin bonded pigment system containing pigment fast to chlorine bleaching, and a second color component derived from an acid fixed fiber reactive dye that is subject to discharge upon application of a chlorine bleaching agent to the fabrics.

Colored fabrics produced according to the present invention exhibit considerably deeper or heavier shades than are normally obtained with resin bonded pigment colors alone, and have much improved resistance to crocking, as well as good all around fastness, including abrasive wash fastness and resistance to acid and alkaline perspiration. The single significant fastness exception is the sensitiveness of the fiber reactive dye component to chlorine bleaching, and this exception is incorporated purposely to render the fabrics of this invention subject to subsequent color change or selective local marking through application of a chlorine bleaching or oxidizing agent (e.g., sodium hypochlorite, calcium hypochlorite, or sodium chlorite) to the fabric.

For example, when the fiber reactive dye component is a yellow of the sort noted further below, subsequent color changing can be effected representatively as follows:

| If the composite original shade is: | The changed shade upon bleaching will be: |
|---|---|
| Green | Blue. |
| Orange | Red. |
| Orange-Red | Blue-Red. |
| Grey-Black | Violet. |
| Brown | Violet. |
| Gold | Beige. |
| Lime | Grey. |

The foregoing listing of changeable shade possibilities might, of course, be extended almost endlessly. The resin bonded pigment component of the original shade can be based on any of the organic or inorganic pigments commonly used for textile dyeing and printing that produces a color fast to chlorine bleaching. The pigment selected should also have reasonable all around fastness properties so as to match reasonably those of the fiber reactive dye component. Suitable examples are phthalocyanine blue (C.I. Pigment Blue 15), phthalocyanine green (C.I. Pigment green 7), benzidene yellow (C.I. Pigment yellow 14), Hostaperm yellow HR (C.I. Pigment yellow 83), or the monoazo pigment Acramine red FRC (C.I. Pigment Red 146).

The fiber reactive dye component employed according to the present invention is one of the fiber reactive dyes produced by American Cyanamid Company, which are characterized by an m-[bis(methylolcarbamoylethyl) sulfamoyl]phenyl grouping having a chromophore coupled at any available position on the ring either directly or through a bridging group. The fiber reactive yellow referred to above is N,N-bis(methylolcarbamoylethyl)-m-(5 - hydroxy - 3 - methyl - 1 - p - sulfophenyl - 4 - pyrazolylazo)benzenesulfonamide sodium salt. The fiber reactive turquoise of the same series is copper phthalocyanine trisodium sulfonate containing an m-[bis(methylolcarbamoylethyl) sulfamoyl] phenyl substituted sulfamoyl group; and the red is $N^1,N^1$-bis(methylolcarbamoylethyl)-$N^3$ - {4 - hydroxy - 6 - [(8 - hydroxy - 3,6 - disulfo - 7 - o-sulfophenylazo - 1 - naphthyl)amino] - s - triazine - 2-sulfamoyl}metanilamide trisodium salt. The structure form of the foregoing particular fiber reactive dyes of the series may be represented, respectively, as follows:

Yellow

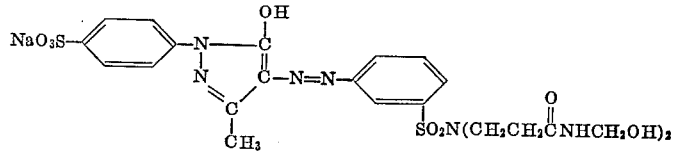

Turquoise

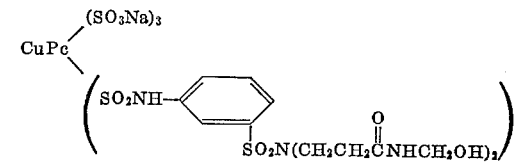

where CuPc is copper phthalocyanine

Red

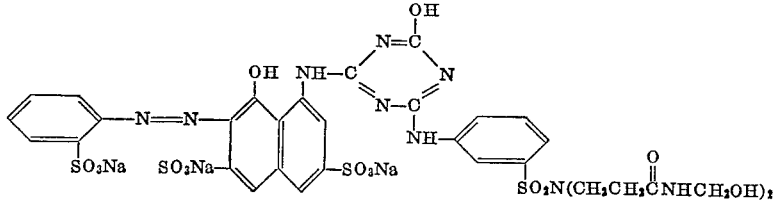

In addition to the previously noted sensitivity of these fiber reactive dyes to chlorine, a further aspect of particular advantage is their ability to react with cellulosic fibers under acid conditions, which means that they can be applied readily from a printing paste or a padding liquor in admixture with a resin bonded pigment system, as indicated by the following examples (in which the percentages given are by weight).

Example I—Printing paste

| | Percent |
|---|---|
| Phthalocyanine Blue Pigment | 0.3 |
| Dispersing agent (non-ionic aryl polyglycol ether) | 0.1 |
| Reactive binder (vinyl acetate-acrylic copolymer, such as Resyn 2833) | 5.0 |
| Ammonium hydroxide | 0.1 |
| Reactive latex (butadiene-styrene type, such as Goodrite 2570X5) | 5.0 |
| Thickener emulsion (86.5%) composed of: | |
|    Keltex S | 3.0 |
|    Water | 85.0 |
|    Ludigol | 1.0 |
|    Ammonium sulfate catalyst | 1.0 |
|    Urea | 10.0 |
| Specified fiber reactive yellow | 3.0 |

The pigment is pre-dispersed in a colloid mill or the like, and the thickener is premixed, in the course of suitably combining the paste ingredients otherwise in the order listed. The resulting paste is used for printing a cellulosic fiber fabric (e.g., cotton, or viscose rayon, or any of the polynosic fibers) in the usual manner followed by drying, curing, soaping and drying. Both the initial and final drying is done according to conventional practice (e.g., by one to two minute passage over drying cans operating at a surface temperature of 290° F.), with intervening curing at 320° F. for three minutes and soaping at 160–170° F. for two minutes. As applied, the printing paste formulation will have a system pH of about 8.5, but the ammonium sulfate catalyst breaks down during the initial drying step to give off ammonia, and acid conditions are thereby established at a pH of about 5.0 for the curing step during which fixing of the fiber reactive dye and polymerization of the pigment binder takes place. The printed fabric has an original green shade of excellent depth and crock resistance, and possesses good general fastness except for the sensitiveness of the fiber reactive dye to chlorine bleaching. When a sample of the printed fabric, or a garment or other article formed therefrom, is placed in an automatic washer of 15-gallon capacity and 8 liquid ounces of Chlorox (sodium hypochlorite as supplied commercially by The Chlorox Company at 5.25% concentration) is added to the wash water, the washed fabric has a residual blue shade substantially as if it had been originally colored only with the resin-bonded pigment.

Example II—Padding liquor

| | Percent |
|---|---|
| Phthalocyanine blue pigment | 0.3 |
| Dispersing agent (aryl polyglycol ether) | 0.1 |
| Keltex S | 0.4 |
| Binder (vinyl acetate-acrylic copolymer, such as Resyn 2833) | 2.0 |
| Crosslinking co-binder (emulsified butylated melamine resin, such as Sherdye padding emulsion) | 0.75 |
| Ammonium sulfate catalyst | 0.8 |
| Specified fiber reactive yellow | 2.5 |
| Water | 93.15 |

The pigment is pre-dispersed in a colloid mill or the like and then added to a dye tank in which a part of the water has been placed, followed by addition of the remaining ingredients, suitably in the order listed, while a mild agitation is maintained. Normal padding technique is employed to apply the dye liquor, followed by drying, curing, soaping and drying as in Example I, with comparable results both as to original shade and response to chlorine bleaching.

Example III—Printing paste

Shading results comparable to those noted in Example I are obtained by substituting benzidene yellow pigment and the specified fiber reactive turquoise in the paste formulation, although the sensitiveness to chlorine bleaching is not as pronounced. Only the yellow has been found to respond to dilute Chlorox without prolonged treatment. However, both the turquoise and the red respond immediately to Chlorox at commercial strength which makes the colored fabric subject to selective local marking in interesting ways. For example, local hand marking can be done readily by applying Chlorox with a pencil-like applicator having a tip of sponge or wick material to work personally selected local designs or legends or the like into the fabric. Alternatively, processed effects of the same sort can be obtained by applying a bleaching agent, such as calcium hypochlorite, at suitable concentration from a paste formulation with an engraved printing roll. Either hand or process application of the concentrated bleach should be followed by washing with mild soap.

Example IV—Padding liquor

The specified fiber reactive turquoise can be similarly substituted in Example II along with Hostaperm yellow HR pigment to obtain comparable shading results, and chlorine bleach sensitivity of the order indicated by Example III.

Example V—Printing paste

A suitable variation of the Example I printing paste formulation, and an illustration of the use of the specified fiber reactive red dye is as follows:

| | Percent |
|---|---|
| Phthalocyanine green pigment | 0.3 |
| Dispersing agent (sodium lauryl sulfate, such as Dupanol WA) | 0.1 |
| Reactive acrylic binder (such as Rhoplex K–3) | 5.0 |
| Thickener emulsion (91.6%) composed of: | |
|    Highly substituted starch ether | 1.5 |
|    Varsol | 25.0 |
|    Water | 71.4 |
|    Sitol | 1.0 |
|    Ammonium sulfate catalyst | 1.0 |
|    Emulsifying agent (non-ionic aryl polyglycol ether) | 0.1 |
| Specified fiber reactive red | 3.0 |

Example VI—Padding liquor

An illustration of a varied padding system incorporating the fiber reactive red is as follows:

| | Percent |
|---|---|
| Phthalocyanine green pigment | 0.4 |
| Dispersing agent (ethylene oxide condensate of nonyl phenol, such as Igepal CO–630) | 0.15 |
| Sodium salt of methacrylic acid | 0.4 |
| Reactive binder (acrylic co-polymer, such as Acramin Binder TRN) | 3.0 |
| Crosslinking co-binder (self-emulsifiable butylated melamine resin, such as Rhonite 401) | 0.75 |
| Ammonium sulfate catalyst | 0.8 |
| Specified fiber reactive red | 2.5 |
| Water | 92.0 |

All of the ingredients referred to in the foregoing examples by trademark designation are commercial grades of the materials indicated in the examples or as indicated further below:

Resyn 2833 is an emulsion having the indicated resin base and is available from National Starch Products, Inc.;

Good-Rite 2570X5 is the indicated reactive copolymer latex and is available from B. F. Goodrich Chemical Co.;

Keltex S is a refined grade of algin obtained as a sodium derivative of algin in powder form and is available from the Kelco Company;

Ludigol and Sitol are the sodium salt of nitrobenzene metasulfonic acid and is available, respectively, from General Aniline & Film Corp. and E. I. duPont de Nemours & Co.;

Sherdye Padding Emulsion is based on the indicated melamine-formaldehyde resin in emulsified form and is available from Sherwin-Williams Co.;

Duponal WA is the indicated dispersing agent and is available in either flake or paste form and is available from E. I. duPont de Nemours & Co.;

Rhoplex K-3 is an acrylic resin derivative and is available from Rohm & Haas Co.;

Varsol is a petroleum hydrocarbon solvent having a boiling range of 304–394° F. and is available from Esso Standard Oil Co.;

Igepal CO-630 is the indicated alkylphenolethylene oxide condensation product and is available from General Aniline & Film Corp.;

Acramin Binder TRN is a copolymer based on butyl acrylate and styrene and is available from Verona-Pharma Chemical Corp.; and Rhonite 401 is a melamine-formaldehyde resin and is available from Rohm & Haas Co.

While the foregoing fiber reactive dyes, because of their ability to fix under acid conditions, may be formulated readily with resin bonded pigments for application together as exemplified above, it is also possible to obtain comparable results by printing or padding them separately, or by printing one and padding the other.

In any event the composite shading possibilities provided according to the present invention with these chlorine-bleach sensitive fiber reactive dyes in combination with resin bonded pigments offers changeable color and novelty pattern variations that are unique in the art.

This invention has been described in detail above for purposes of illustration only and is not intended to be limited by this description or otherwise except as defined in the appended claims.

We claim:

1. The method of coloring cellulosic fiber fabrics which comprises applying a composite shade to said fabric by supplying a first color component from a resin bonded pigment system containing pigment fast to chlorine bleaching and a second color component from an acid fixed fiber reactive dye that is subject to discharge in the presence of a chlorine bleaching agent, drying the fabric following such application and thereby establishing acid conditions on the fabric, and then curing the dried fabric to fix both color components, said fiber reactive dye being characterized by the group m-[bis(methylolcarbamoylethyl]phenyl coupled at any available position on the ring with a grouping selected from the class consisting of a chromophore and a chromophore together with a briding group.

2. A colored cellulosic fiber fabric having a shade obtained by the process of claim 1.

3. A colored fabric as defined in claim 2 and further characterized in that said acid fixed fiber reactive dye is N,N - bis(methylolcarbamoylethyl) - m - (5 - hydroxy - 3 - methyl - 1 - p - sulfophenyl - 4 - pyrazolylazo(benzenesulfonamide)sodium salt.

4. A colored fabric as defined in claim 2 and further characterized in that said acid fixed fiber reactive dye is copper phthalocyanine trisodium sulfonate containing an m-[bis(methylolcarbamoylethyl)sulfamoyl]phenyl substituted sulfamoyl group.

5. A colored fabric as defined in claim 2 and further characterized in that said acid fixed fiber reactive dye is $N^1,N^1$ - bis(methylolcarbamoylethyl) - $N^3$ - (4 - hydroxy - 6 - [(8 - hydroxy - 3,6 - disulfo - 7 - 0 - sulfophenylazo - 1 - naphthyl)amino]-s-triazine-2-sulfamoyl}metanilamide trisodium salt.

References Cited
UNITED STATES PATENTS
3,138,567  6/1964  Abrams et al. _____ 8—1.2

OTHER REFERENCES
S. R. Cockett, K. A. Hilton, "Dyeing of Cellulose Fibres," Academic Press, New York, 1961, pp. 269–71, 274, 334–35, 340–41.

NORMAN G. TORCHIN, *Primary Examiner.*

J. E. CALLAGHAN, *Assistant Examiner.*

U.S. Cl. X.R.

8—1.2, 65

PO-1050
(5/69)

UNITED STATES PATENT OFFICE
CERTIFICATE OF CORRECTION

Patent No. 3,447,888　　　　Dated　June 3, 1969

Inventor(s) Herman S. Weisz and Parker W. Downing

It is certified that error appears in the above-identified patent and that said Letters Patent are hereby corrected as shown below:

Column 6, line 10, "briding" should read -- bridging --; line 16, the starting parenthesis "(" should be a closing one -- ) --; line 17, the closing parenthesis ")" should be deleted; line 26, the portion of the formula reading "-O-" should read -- -o- --.

SIGNED AND
SEALED
MAR 31 1970

(SEAL)
Attest:

Edward M. Fletcher, Jr.
Attesting Officer

WILLIAM E. SCHUYLER, JR.
Commissioner of Patents